United States Patent
Dinh et al.

(10) Patent No.: US 10,300,658 B2
(45) Date of Patent: May 28, 2019

(54) CRACK RESISTANT PLASTIC ENCLOSURE STRUCTURES

(71) Applicant: Apple Inc., Cupertino, CA (US)

(72) Inventors: Richard H. Dinh, San Jose, CA (US); Daniel W. Jarvis, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 326 days.

(21) Appl. No.: 13/628,568

(22) Filed: Sep. 27, 2012

(65) Prior Publication Data
US 2013/0292396 A1    Nov. 7, 2013

Related U.S. Application Data

(60) Provisional application No. 61/642,426, filed on May 3, 2012.

(51) Int. Cl.
*C25D 5/02*      (2006.01)
*B29C 63/34*    (2006.01)
(Continued)

(52) U.S. Cl.
CPC ............. *B29C 63/34* (2013.01); *B29C 65/08* (2013.01); *B29C 66/474* (2013.01);
(Continued)

(58) Field of Classification Search
CPC .................................................... C25D 5/02
(Continued)

(56) References Cited

U.S. PATENT DOCUMENTS 4,455,448 A * 6/1984 Bertolina ............. H05K 9/0056
                                                      174/386
5,532,703 A * 7/1996 Stephens et al. ............. 343/702
(Continued)

FOREIGN PATENT DOCUMENTS

CN      102025020    *  4/2011    ............... H01Q 1/22
DE    102010012146        9/2011
(Continued)

OTHER PUBLICATIONS

Nishiyama, T., English translation of JP 57-102100, "Through-hole printed wiring board and method for manufacturing same", 1982, H05K3/42.*

*Primary Examiner* — Stefanie S Wittenberg
(74) *Attorney, Agent, or Firm* — Dorsey & Whitney LLP

(57) ABSTRACT

Electronic device housing structures and other structures may be formed from molded plastic. Plastic structures such as injection molding housing structures and other structures may be provided with openings. An opening may have sidewall surfaces. Machining operations and other techniques may be used in forming the openings. Openings may be processed to enhance resistance to stress-induced cracking of the plastic structures along the sidewall surfaces. Cracking resistance may be obtained by activating the surface using heat or laser treatment and by electroplating the activated surface to form a metal liner structure. Surface treatments using applied liquid chemicals or heat may form a treated layer on the surface of an opening with enhanced cracking resistance. A plastic sleeve or other insert may form a liner structure in an opening that resists cracking. Liner structures may also be formed by applying heat or light to a coating in an opening.

14 Claims, 12 Drawing Sheets

(51) Int. Cl.
  *B29L 31/00* (2006.01)
  *B29L 31/34* (2006.01)
  *B29C 65/08* (2006.01)
  *B29C 65/00* (2006.01)

(52) U.S. Cl.
  CPC ............... *B29C 2793/0018* (2013.01); *B29L 2031/3481* (2013.01); *B29L 2031/737* (2013.01); *Y10T 29/4998* (2015.01)

(58) Field of Classification Search
  USPC ........................................................ 205/131
  See application file for complete search history.

(56) References Cited

U.S. PATENT DOCUMENTS

| | | | |
|---|---|---|---|
| 5,544,773 A * | 8/1996 | Haruta et al. .................... 216/13 |
| 5,673,176 A * | 9/1997 | Penniman ............ H05K 7/1422 257/718 |
| 5,867,140 A * | 2/1999 | Rader .................... G09G 5/363 345/100 |
| 6,014,552 A * | 1/2000 | Aiken et al. ................ 455/575.1 |
| 6,426,468 B1 | 7/2002 | Utsunomiya et al. ........ 174/261 |
| 6,438,390 B1 * | 8/2002 | Awan ............................ 455/566 |
| 7,106,580 B2 | 9/2006 | Kugimiya et al. |
| 7,255,228 B2 | 8/2007 | Kim |
| 7,373,815 B2 | 5/2008 | Kozawa et al. |
| 2004/0244856 A1 * | 12/2004 | Schauz ............... F15B 13/0821 137/884 |
| 2005/0064707 A1 * | 3/2005 | Sinha ................ H01L 21/76898 438/667 |
| 2005/0067681 A1 * | 3/2005 | De Villeneuve et al. .... 257/678 |
| 2006/0141159 A1 * | 6/2006 | Okuda ................ B29C 44/5618 427/331 |
| 2007/0163887 A1 * | 7/2007 | Hofmann ........................ 205/80 |
| 2008/0039161 A1 | 2/2008 | Chan |
| 2009/0004382 A1 | 1/2009 | Poole et al. |
| 2009/0245565 A1 * | 10/2009 | Mittleman ............ H04M 1/035 381/365 |
| 2010/0200456 A1 * | 8/2010 | Parkinson ..................... 206/701 |
| 2011/0316759 A1 | 12/2011 | Fan et al. |
| 2012/0074007 A1 | 3/2012 | Drummer |
| 2012/0224299 A1 * | 9/2012 | Myers .................. H05K 5/0213 361/679.01 |
| 2013/0193575 A1 * | 8/2013 | Shen .................. H01L 23/3128 257/751 |

FOREIGN PATENT DOCUMENTS

| | | | | |
|---|---|---|---|---|
| GB | 2070647 | * | 9/1981 | ............ C23C 18/16 |
| GB | 2463712 | * | 3/2010 | ............ B29C 65/00 |
| JP | 56-159121 | * | 12/1981 | ............ B29C 17/10 |
| JP | 57102100 | | 6/1982 | |
| JP | 01223643 | | 9/1989 | |

* cited by examiner

CRACK RESISTANT PLASTIC ENCLOSURE STRUCTURES

This application claims the benefit of provisional patent application No. 61/642,426, filed May 3, 2012, which is hereby incorporated by reference herein in its entirety.

BACKGROUND

This relates generally to plastic structures, and more particularly, to forming plastic structures that resist cracking.

Electronic devices such as portable computers and cellular telephones are often provided with plastic structures such as plastic housings. To accommodate ports for connectors and components such as buttons, openings must be formed in these plastic structures. Openings that are formed as part of a plastic molding operation may exhibit poorly defined edges. Machining operations can be used to form openings with crisp edges, but may impart residual stress. Residual stress in a plastic structure may lead to premature cracking during use of a device. If care is not taken, cracks may become unsightly or may compromise the structural integrity of a housing for an electronic device.

It would therefore be desirable to be able to provide improved plastic structures with openings such as improved plastic housing structures.

SUMMARY

Electronic device housing structures and other structures may be formed from molded plastic. Plastic structures such as injection molding housing structures and other structures may be provided with openings. Machining operations and other techniques may be used in forming the openings.

Openings in the plastic structures may have sidewall surfaces. The openings may be processed to enhance resistance to stress-induced cracking of the plastic structures along the sidewall surfaces. Enhanced cracking resistance may be obtained by activating the surface using heat or laser treatment and by electroplating the activated surface to form a metal liner structure. Surface treatments such as treatments involving the application of chemicals or heat may be used to form a treated layer on the surface of an opening that exhibits an enhanced cracking resistance. A plastic sleeve or other insert may form a liner structure in an opening to help resist cracking. Liner structures may also be formed by depositing a coating on a sidewall surface and applying heat or light to the coating.

Further features of the invention, its nature and various advantages will be more apparent from the accompanying drawings and the following detailed description of the preferred embodiments.

DETAILED DESCRIPTION

Figure 1:
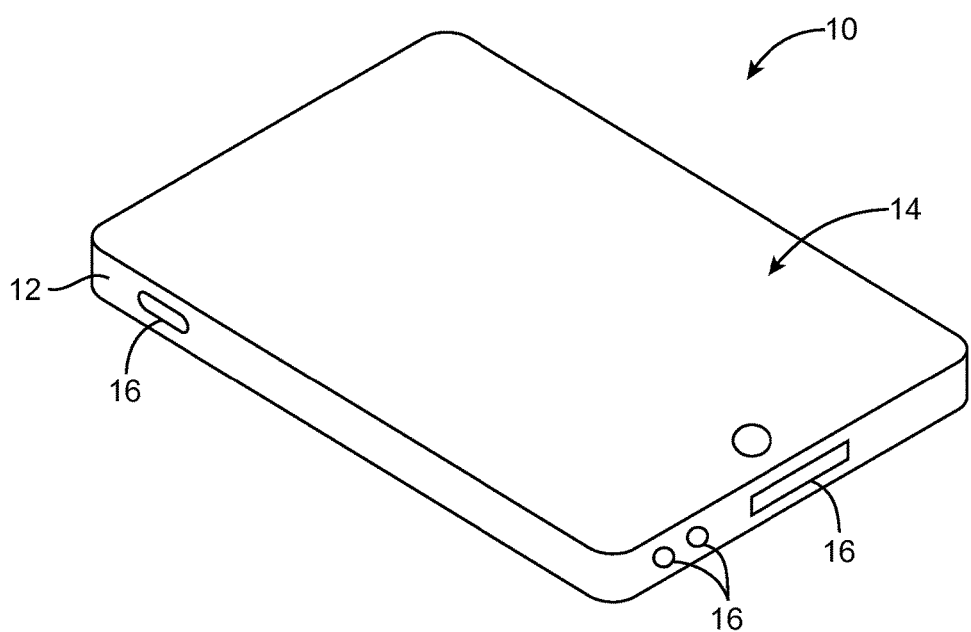
FIG. 1 is a front perspective view of an illustrative electronic device of the type that may have a plastic structure with an opening such as a plastic housing structure in accordance with an embodiment of the present invention.

Electronic devices such as electronic device 10 of FIG. 1 and other electronic equipment may be provided with plastic housing structures and other plastic structures. Electronic device 10 may be a tablet computer, a cellular telephone, a media player, a portable computer, a computer integrated into a computer display, a desktop computer, a television, a wristwatch or other miniature device, or other electronic equipment. As shown in FIG. 1, device 10 may include a housing structure such as housing 12. A display such as display 14 may be mounted in housing 12 (as an example). Display 14 may be a touch screen or may be a display that is insensitive to touch.

Housing 12, which may sometimes be referred to as a case or enclosure, may be formed from one or more materials such as internal metal frame structures, optional peripheral conductive members such as metal housing wall structures and display bezels, internal support structures, carbon-fiber composites and other composite materials, glass, ceramics, etc. With one suitable arrangement, which is sometimes described herein as an example, structures in device 10 such as external housing structures 12 may be formed from plastic (e.g., a rigid polymer). Examples of plastics that may be used for forming housing structures 12 include polycarbonate (PC), acrylonitrile butadiene styrene (ABS), and PC/ABS blends (as examples). Other plastics may be used for forming portions of housing 12, for forming other housing structures, and for forming other plastic structures associated with device 10.

Housing 12 may have one or more openings such as openings 16. Openings 16 may have circular shapes, rectangular shapes, overall shapes, shapes with curved edges, shapes with straight edges, shapes with combinations of curved and straight edges, or other suitable outlines. Openings 16 may be used to form ports for connectors. For example, openings 16 may include circular holes that receive audio plugs, rectangular holes to receive digital signal plugs, and openings of other shapes to receive other connectors. Openings 16 may also be used to accommodate buttons and other user input devices, openings to accommodate status indicator lights, openings to accommodate sensors, and openings to accommodate other components in device 10. In the illustrative example of FIG. 1, openings 16 have been formed on sidewall portions of housing structures 12. This is merely illustrative. Any suitable plastic structures in device 10 may be provided with openings such as openings 16 if desired.

Openings 16 or part of openings 16 may be formed during molding operations (e.g., by injection molding plastic into a die that contains mold structures for forming at least part of openings 16). If desired, machining tools or other equipment for removing material from plastic structures 12 may be used in forming openings 16 (e.g., to form openings 16 from a solid piece of plastic or to widen openings that have been partly formed during a molding process). To help prevent cracks from forming in the portions of plastic structures 12 in the vicinity of openings 16, openings 16 may be exposed to surface treatment, may be supported by forming ancillary liner structures in openings 16, or may otherwise be processed to resist cracking.

FIGS. 2-8 show illustrative equipment 18 of the type that may be used in forming openings 16 and in processing openings 16 to form liner structures and other structures that help openings 16 resist cracking.

Figure 2:
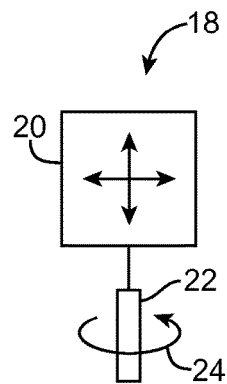
FIG. 2 is a diagram of a tool for performing machining operations in accordance with an embodiment of the present invention.

As shown in FIG. 2, equipment 18 may include a machining tool having a computer-controlled positioner such as positioner 20 and a cutting structure such as structure 22 that is manipulated using positioner 20. Positioner 20 may include a motor for rotating a shaft to which a cutter 22 is coupled, may include one or more linear actuators for adjusting the position of cutter 22, or may include other positioning equipment. Cutter 22 may be rotated in direction 24 by positioner 20 (as an example). Cutting structures such as cutter 22 may include drill bits, saw blades, milling machine cutters, grinders, and other machining equipment.

Figure 3:
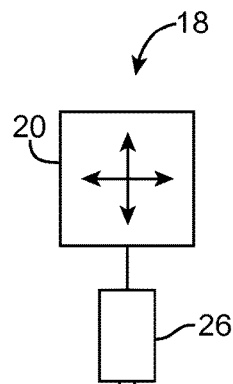
FIG. 3 is a diagram of a tool for applying energy to a structure in the form of light, acoustic signals, or other types of energy in accordance with an embodiment of the present invention.

As shown by equipment 18 in the example of FIG. 3, equipment 18 may include a source of energy 28 (e.g., a beam of localized energy or other localized energy) such as source 26. Energy 28 may be electromagnetic energy (e.g., radio-frequency electromagnetic signals), light (e.g., laser light such as a laser beam), heat (e.g., infrared light in the form of lamp light or laser light), acoustic energy (e.g., ultrasonic acoustic signals for forming ultrasonic welds), or may be other forms of energy. Source 26 may be an ultrasonic acoustic signal generator (e.g., an ultrasonic welder), a light source such as a lamp that produces lamp light, a light source such as a laser that produces laser light, or other source of energy 28. As an example, source 26 may be a laser that produces infrared light 28, visible light 28, or ultraviolet light 28. The position of source 26 and energy 28 may be controlled using computer-controlled positioner 20.

Figure 4:
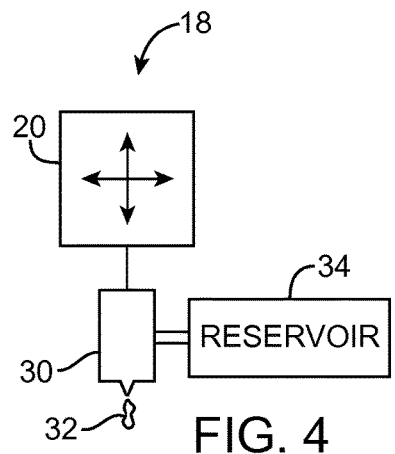
FIG. 4 is a diagram of a tool for applying substances such as liquids and pastes to a structure in accordance with an embodiment of the present invention.

FIG. 4 is a diagram of equipment 18 in an illustrative configuration in which equipment 18 includes a nozzle or other dispensing equipment for dispensing material 32 from reservoir 34. Equipment 18 may use computer-controlled positioner 20 to control the positioner of dispensing head 30 as material 32 is being dispensed. Material 32 may include liquid chemicals such as solvents, liquid adhesives, ultraviolet-light-cured liquid adhesive, liquid polymer precursors, solder paste, paint, or other suitable materials.

Figure 5:
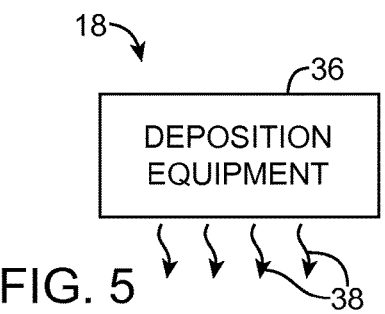
FIG. 5 is a diagram of illustrative deposition equipment for depositing material onto a structure in accordance with an embodiment of the present invention.

As shown in FIG. 5, equipment 18 may include deposition equipment 36 for depositing material 38. Equipment 36 may include physical vapor deposition equipment, painting equipment, spraying equipment, screen printing equipment, pad printing equipment, inkjet equipment, dipping equipment, plastic injection molding equipment and other equipment for depositing material 38. Material 38 may include polymeric materials such as thermoset and thermoplastic plastics, adhesive, solder paste, paint, metals, glass, ceramics, and other suitable materials.

Figure 7:
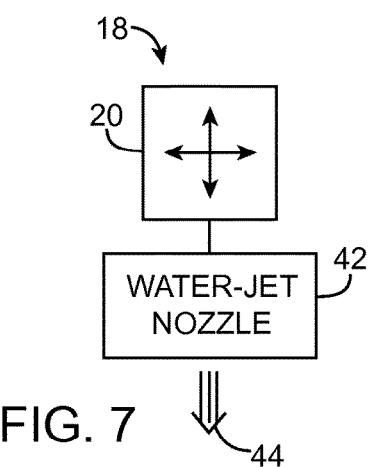
FIG. 7 is a diagram of illustrative water-jet cutting equipment in accordance with an embodiment of the present invention.

As shown in FIG. 7, equipment 18 may include cutting equipment such as water-jet cutting equipment having a computer-controlled positioner such as positioner 20 and a water-jet nozzle such as nozzle 42. As the position of water-jet nozzle 42 is controlled using positioner 20, water-jet nozzle 42 may emit a jet of water such as water 44. Abrasives or other materials in water jet 44 may facilitate the use of equipment 18 in cutting plastics and other materials.

Figure 8:
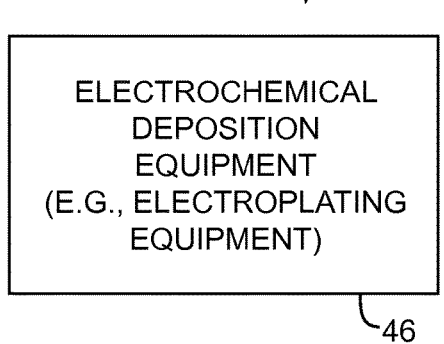
FIG. 8 is a diagram of illustrative electrochemical deposition equipment in accordance with an embodiment of the present invention.

FIG. 8 shows how equipment 18 may include electrochemical deposition equipment such as equipment 46. Equipment 46 may be used to deposit metal. For example, equipment 46 may include a chemical bath for electroless plating of metals such as copper, nickel, or other metals or may include equipment for forming electrochemically deposited materials.

Figure 9:
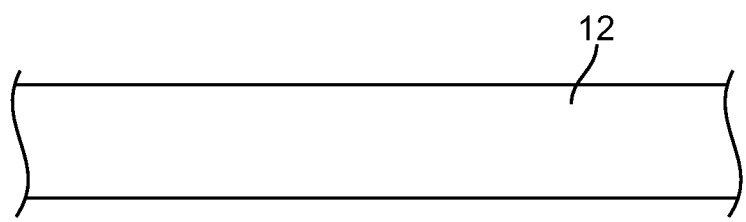
FIG. 9 is a side view of an illustrative plastic structure prior to forming an opening in the plastic structure in accordance with an embodiment of the present invention.

With equipment of the type shown in FIGS. 2-8 and/or other suitable manufacturing equipment, openings such as openings 16 may be formed in housing 12 or other plastic structures. Consider, as an example, the arrangement of FIGS. 9 and 10. As shown in FIG. 9, plastic structures 12 (e.g., a housing wall in device 10, other planar plastic structures, or other plastic material) may initially be free of holes.

Figure 10:
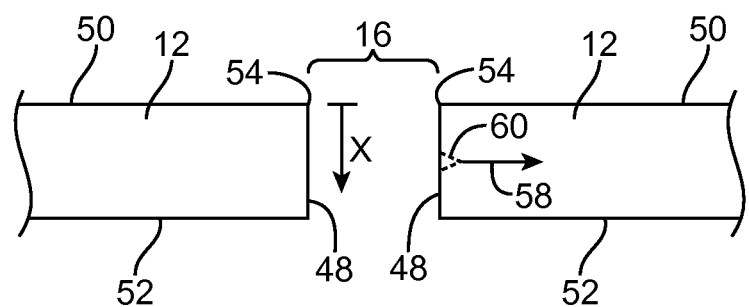
FIG. 10 is a cross-sectional side view of the plastic structure of FIG. 9 after forming an opening in the plastic structure in accordance with an embodiment of the present invention.

Using equipment 18, an opening such as opening 16 of FIG. 10 may be formed in plastic structures 12. Opening 16 may have a circular shape, a rectangular shape, or other suitable shape. As shown in the cross-sectional side view of FIG. 10, opening 16 may extend between opening sidewall surfaces 48. Opening sidewall surfaces 48 may, for example, define a cylindrical opening shape (e.g., a cylindrical sidewall) for opening 16. Opposing sidewalls 48 of FIG. 10 run parallel to each other and perpendicular to outer surface 50 and inner surface 52 of plastic structures 12, forming crisp right-angled outer edges such as edges (edge) 54. This is, however, merely illustrative. In general, opening walls 48 may be tapered, may be flared, may have edge treatments that form a rounded feature along periphery 54, or may have other suitable shapes.

Figure 11:
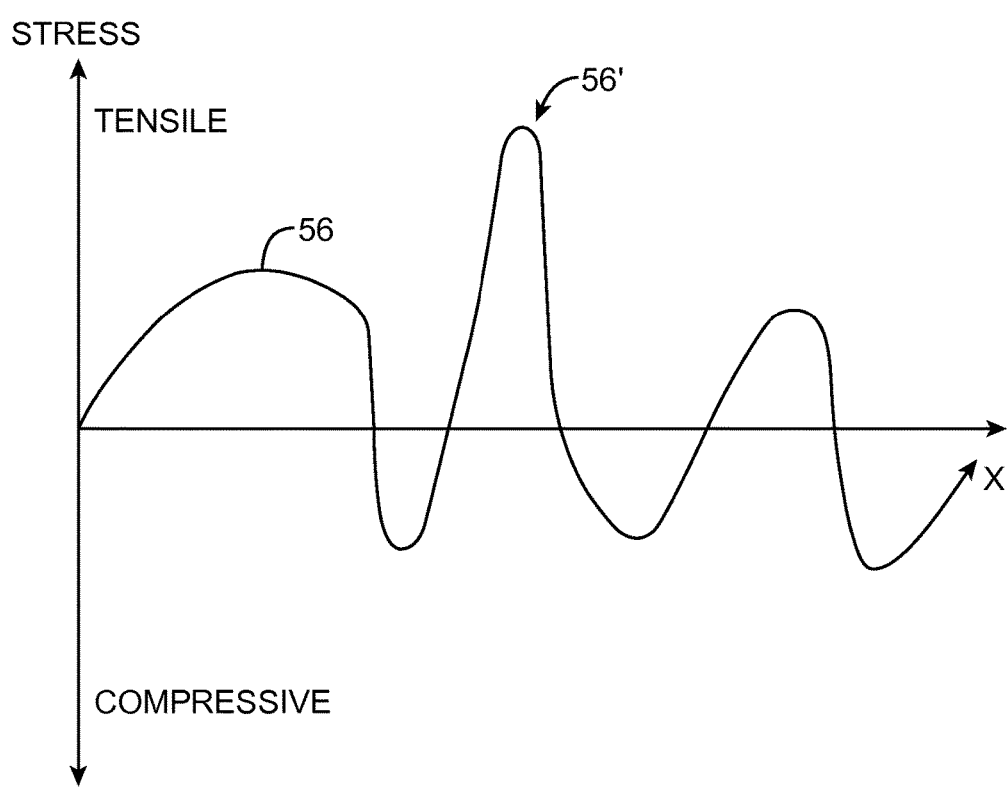
FIG. 11 is a graph showing how hole formation operations may impart residual stress into a plastic structure in accordance with an embodiment of the present invention.

Opening 16 may be formed using laser cutting equipment 18 of FIG. 3, water-jet cutting equipment such as equipment 18 of FIG. 7, or other suitable equipment for forming opening 16. As an example, opening 16 may be formed using machining equipment such as machining equipment 18 of FIG. 2 (e.g., a computer numerical control or CNC machine that uses a cutting tool to remove material from structure 12 during the process of forming opening 16). The use of a machining tool such as tool 18 of FIG. 2 and other equipment may give rise to residual stress in material along the surfaces of opening 16 such as walls 48. As shown in FIG. 10, opening 16 may be characterized by a depth along dimension X. A graph showing illustrative amounts of compressive and tensile stress that may be imparted along walls 48 as a function of distance X from outer edge 54 of opening 16 is shown in FIG. 11. As shown by curve 56, walls 48 may be characterized by different amounts of stress at different corresponding values of distance X. This stress (e.g., regions such as region 56' in which wall 48 is under considerable tensile stress) may serve to initiate the formation of cracks in direction 58 of FIG. 10 such as crack 60. Cracks such as crack 60 may extend over some or all of the height of walls 48 and may extend into structures 12, causing cracking that may be visible along exterior surface 50 and potential structural weakness in plastic structures 12.

To prevent cracks such as crack 60 from forming, opening 16 may be coated with a layer of a material that is less prone to stress cracking such as a layer of a material that exhibits more ductility than plastic 12. An example of a ductile material that may be used to coat opening 16 and thereby help prevent the formation of stress cracks in opening 16 is metal (e.g., copper, nickel, etc.). Other suitable materials may be used to enhance the ability of opening 16 to withstand cracking if desired (e.g., a thermoset or thermoplastic plastic layer that is more ductile than plastic structures 12, etc.).

Figure 12:
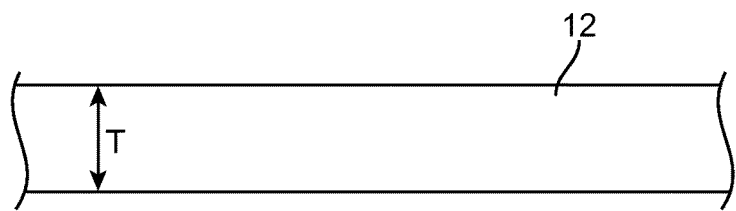
FIG. 12 is a cross-sectional side view of plastic structures of the type that may be provided with an electroplated metal liner structure in accordance with an embodiment of the present invention.

FIGS. 12-15 show how opening 16 may be lined with a material such as plated metal to help prevent stress-induced cracking. Initially, plastic structures 12 may appear as shown in FIG. 12. Plastic structures 12 of FIG. 12 may be, for example, planar injection molded housing structures characterized by a wall thickness T. The value of thickness T may be, for example, less than 5 mm, less than 4 mm, less than 3 mm, less than 2 mm, less than 1 mm, or less than 0.5 mm. In the illustrative configuration of FIG. 12, plastic structures 12 are free of coatings. This is merely an example. Plastic structures 12 may, if desired, be covered with paint, one or more additional layers of plastic, or other coatings.

Figure 13:
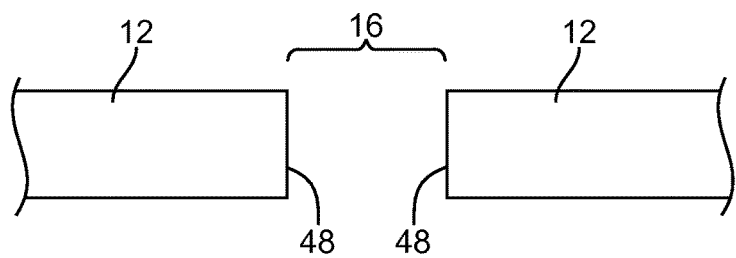
FIG. 13 is a cross-sectional side view of the plastic structures of FIG. 12 following formation of an opening in accordance with an embodiment of the present invention.
Figure 14:
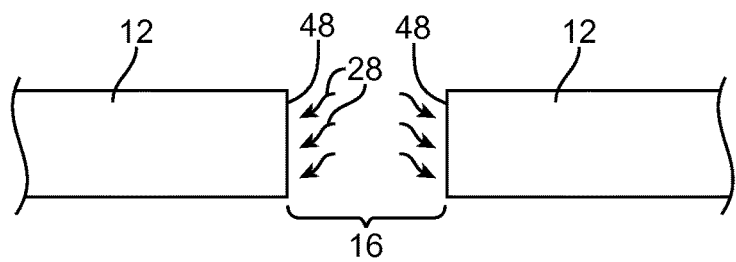
FIG. 14 is a cross-sectional side view of the plastic structures of FIG. 13 showing how the exposed inner surface of the opening may be treated with light to activate the exposed inner surface for subsequent metal plating operations in accordance with an embodiment of the present invention.

As shown in FIG. 13, one or more openings such as opening 16 may be formed in plastic structures 12. Openings such as opening 16 may be formed by using machining equipment such as machining equipment 18 of FIG. 2 or other cutting equipment 18. If desired, the dwell time of cutter 22 on surface 48 of opening 16 may be selected to impart sufficient thermal energy into plastic structures 12 to activate surface 48 for subsequent metal plating. Surface 48 may also be activated for subsequent metal plating (electrochemical metal growth) by shining light 28 on surface 48 as shown in FIG. 14. For example, equipment 18 of FIG. 3 may be used to apply laser light 28 (e.g., infrared laser light or laser light of other wavelengths) to surface 48 or other surfaces associated with opening 16 that may be susceptible to stress-induced cracking. If desired, metal complexes may be incorporated into plastic structures 12 to enhance the ability of heat from cutting tool 22 and/or light such as laser light 28 to selectively activate surface 48 for subsequent electroplating.

Figure 15:
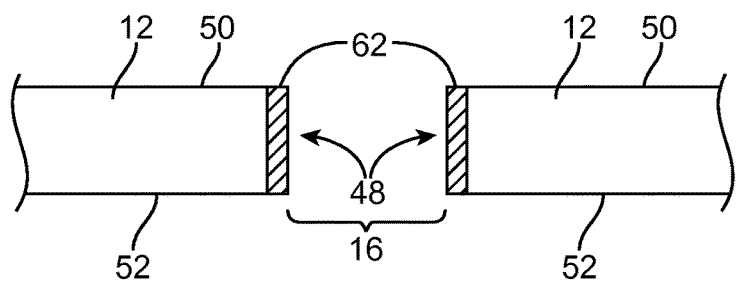
FIG. 15 is a cross-sectional side view of the plastic structures of FIG. 14 following electroplating operations to grow a layer of metal on the inner surface of the opening in accordance with an embodiment of the present invention.

Following activation of surface 48 using laser light 28 or activation of surface 48 by adjusting the dwell time of machining equipment such as equipment 18 of FIG. 2 or otherwise selectively treating surface 48 with equipment 18, electrochemical deposition equipment (e.g., electroless metal plating equipment) such as equipment 18 of FIG. 8 may be used to form a metal layer such as metal layer 62 of FIG. 15 on surfaces 48 of opening 16. If desired, portions of outer surface 50 and/or inner surface 52 of plastic structures 12 may also be coated in this way. Metal 62 may be more ductile than plastic structures 12 and may therefore be more resistant to formation of stress-induced cracks in its surface.

This may help eliminate the formation of stress-induced cracks in plastic structures 12 in the vicinity of opening 16, even when the machining operations that were used to form opening 16 (e.g., the machining operations performed using machining equipment 18 of FIG. 2) have the potential to introduce stresses into plastic structure 12. Examples of metals that may be plated onto surface 48 of opening 16 include copper and nickel. Metal 62 may be formed from other metals or combinations of metals, if desired.

Figure 16:
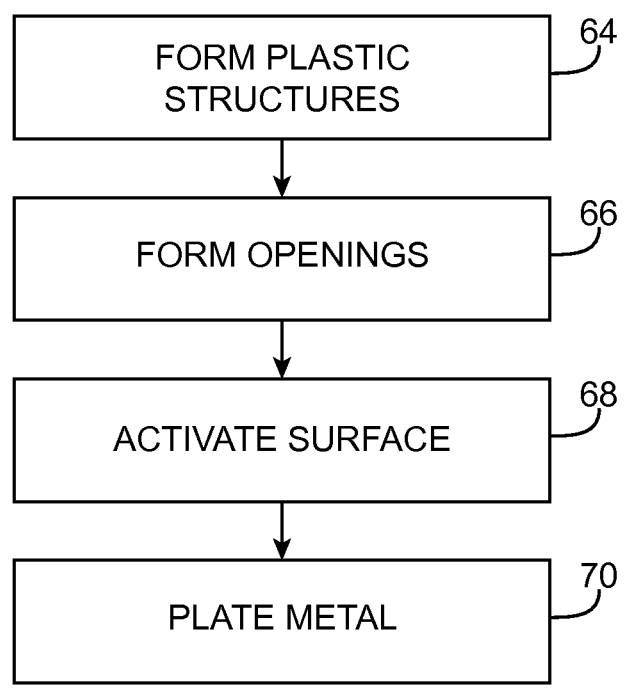
FIG. 16 is a flow chart of illustrative steps involved in forming plastic structures having an opening that is coated with plated metal to reduce stress-induced cracking in accordance with an embodiment of the present invention.

A flow chart of illustrative steps involved in forming a metal-coated opening such as metal-coated opening 16 of FIG. 15 is shown in FIG. 16.

At step 64, an injection molding operation or other operation may be used in forming plastic structures 12. For example, plastic such as polycarbonate, ABS, PC/ABS, or other thermoplastic materials may be injection molded into a metal mold having a shape of an electronic device housing structure for an electronic device such as electronic device 10 of FIG. 1. The plastic material that is used in forming structures 12 may include metal complexes for enhancing the ability of light and/or heat to selectively activate the surface of plastic structures 12 for subsequent electrochemical deposition of metal. The plastic structures that are formed during the operations of step 64 may include electronic device housing walls having a thickness of less than 5 mm, less than 4 mm, less than 3 mm, less than 2 mm, less than 1 mm, or less than 0.5 mm (as examples).

At step 66, machining equipment such as machining tool 18 of FIG. 2 may be used to form opening 16 of FIG. 13. In forming opening 16, cutter 22 of FIG. 2 may, if desired, be caused to dwell sufficiently long on surface 48 to activate surface 48 for subsequent metal growth. Alternatively, or in addition to using dwell time activation techniques, surface 48 may be activated by applying laser light 28 to surface 48 using equipment 18 of FIG. 3 (step 68).

At step 70, electrochemical deposition equipment 18 of FIG. 8 may be used to plate copper, nickel, or other metal 62 onto walls 48 of opening 16, as shown in FIG. 15.

If desired, the surfaces of opening 16 may be treated to enhance the ability of opening 16 to withstand stress-induced cracking. An illustrative surface treatment scheme is illustrated in FIGS. 17, 18 and 19.

Figure 17:
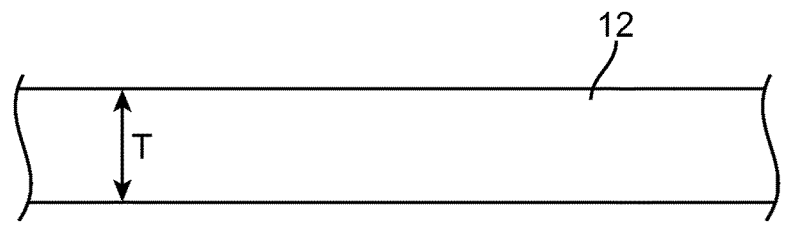
FIG. 17 is a cross-sectional side view of plastic structures of the type that may be used in forming an opening that is provided with a surface treatment to reduce stress-induced cracking in accordance with an embodiment of the present invention.

Initially, plastic structures 12 may appear as shown in FIG. 17. Plastic structures 12 of FIG. 17 may be planar injection molded housing structures characterized by a wall thickness T (e.g., a wall thickness of 0-5 mm or other suitable thickness), as described in connection with FIG. 12. Plastic structures 12 may be, for example, wall structures for a plastic housing for electronic device 10 of FIG. 1.

Figure 18:
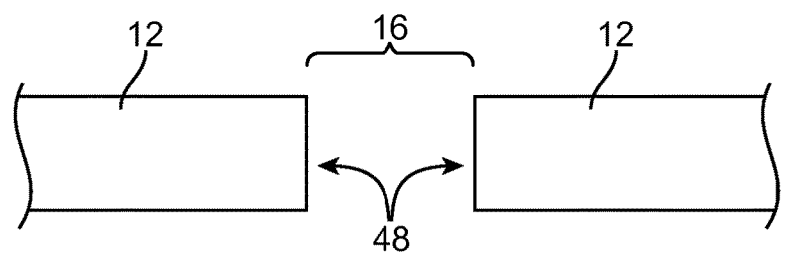
FIG. 18 is a cross-sectional side view of the plastic structures of FIG. 17 following formation of an opening in accordance with an embodiment of the present invention.
Figure 19:
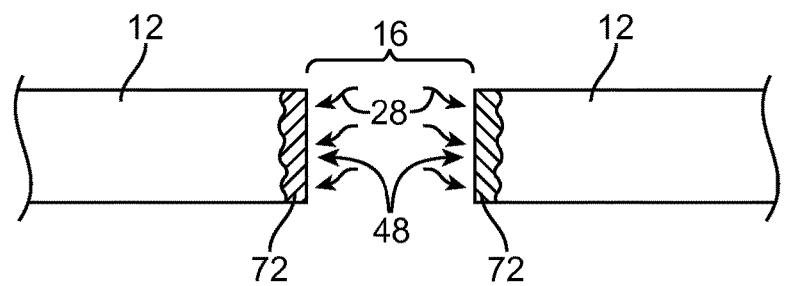
FIG. 19 is a cross-sectional side view of the plastic structures of FIG. 18 showing how a surface treatment may be used to provide the inner surface of an opening with a treated layer having enhanced resistance to cracking in accordance with an embodiment of the present invention.

As shown in FIG. 18, one or more openings such as opening 16 may be formed in plastic structures 12 of FIG. 17. Openings such as opening 16 may be formed by using machining equipment such as machining equipment 18 of FIG. 2 or other cutting equipment 18. As described in connection with FIGS. 10 and 11, hole formation processes such as machining processes have the potential for introducing stresses into the surface of structures 12 along walls 48 of opening 16. These stresses have the potential to give rise to cracks. To enhance the ability of plastic structures 12 to withstand crack formation on walls 48, the surface of walls 48 may be treated using chemicals, heat, light, or other surface treatments. For example, a solvent may be applied to the surface of walls 48 to locally soften walls 48 and relieve built-in stresses, laser light may be applied to locally heat and soften walls 48, ultrasonic energy may be applied to heat and soften walls 48, or heat from a heated tool or an infrared lamp may be applied to locally soften walls 48. Following treatment using these techniques or other suitable surface treatment techniques, walls 48 may be lined with a surface-treated layer (e.g., a chemically treated layer, a thermally softened and re-hardened layer, or a melted and re-hardened layer) such as layer 72 of FIG. 19 that is better able to withstand cracking than untreated surface 48 of FIG. 18.

Figure 20:
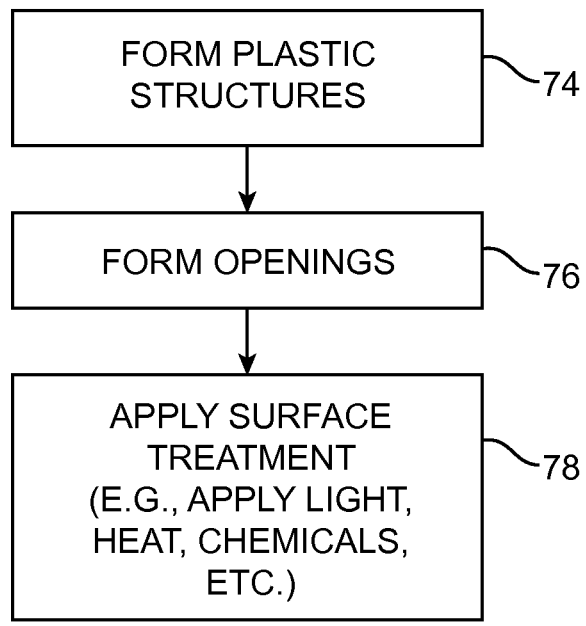
FIG. 20 is a flow chart of illustrative steps involved in forming plastic structures having an opening with walls that are provided with a surface treatment to reduce stress-induced cracking in accordance with an embodiment of the present invention.

A flow chart of illustrative steps involved in treating the surface of opening 16 in plastic structures 12 to enhance the ability of plastic structures 12 to withstand stress-induced cracking is shown in FIG. 20.

At step 74, an injection molding operation or other operation may be used in forming plastic structures 12. For example, plastic such as polycarbonate, ABS, PC/ABS, or other thermoplastic materials may be injection molded into a metal mold having a shape of an electronic device housing structure for an electronic device such as electronic device 10 of FIG. 1. The plastic structures that are formed during the operations of step 74 may include electronic device housing walls having a thickness of less than 5 mm, less than 4 mm, less than 3 mm, less than 2 mm, less than 1 mm, or less than 0.5 mm (as examples).

At step 76, equipment such as machining tool 18 of FIG. 2, laser cutting equipment (see, e.g., equipment 18 of FIG. 3), water-jet cutting equipment such as equipment 18 of FIG. 7, or other equipment may be used to form opening 16 of FIG. 18. In forming opening 16, stress may be imparted to wall 48.

At step 78, equipment 18 (e.g., equipment 18 of FIG. 3 or other heating equipment, equipment for applying a solvent or other chemical to the surface of opening 16 of FIG. 18 such as equipment 18 of FIG. 4, or other suitable surface treatment tool) may be used in treating the surface of walls 48 of opening 16, thereby forming surface-treated layer 72 on the surface of walls 48 in opening 16, as shown in FIG. 19.

If desired, the surfaces of opening 16 may be lined with an insert structure such as a cylindrical sleeve or a sleeve with other suitable shapes configured to mate with the inner surfaces of walls 48 in opening 16. Mounting the sleeve structure within opening 16 may form a liner structure to help enhance the ability of opening 16 to withstand stress-induced cracking. An illustrative lining scheme is illustrated in FIGS. 21, 22, 23, and 24.

Figure 21:
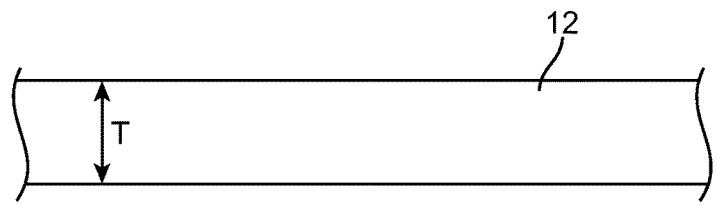
FIG. 21 is a cross-sectional side view of plastic structures such as plastic electronic device housing structures in which an opening may be formed in accordance with an embodiment of the present invention.

Initially, plastic structures 12 may appear as shown in FIG. 21. Plastic structures 12 of FIG. 21 may be planar injection molded housing structures characterized by a wall thickness T (e.g., a wall thickness of 0-5 mm or other suitable thickness), as described in connection with FIG. 12. Plastic structures 12 may be, for example, wall structures for a plastic housing for electronic device 10 of FIG. 1.

Figure 22:
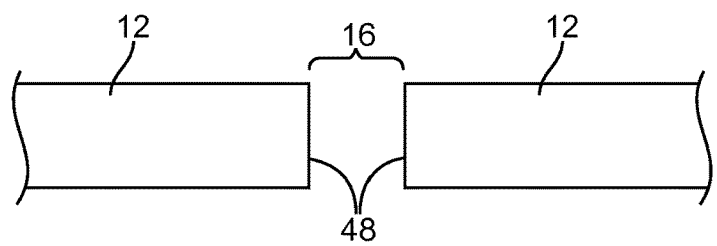
FIG. 22 is a cross-sectional side view of the plastic structures of FIG. 21 following formation of an opening in accordance with an embodiment of the present invention.

As shown in FIG. 22, one or more openings such as opening 16 may be formed in plastic structures 12 of FIG. 21. Openings such as opening 16 may be formed by using machining equipment such as machining equipment 18 of FIG. 2 or other cutting equipment 18. As described in connection with FIGS. 10 and 11, hole formation processes such as machining processes have the potential for introducing stresses into the surface of structures 12 along walls 48 of opening 16. These stresses have the potential to give rise to cracks.

Figure 23:
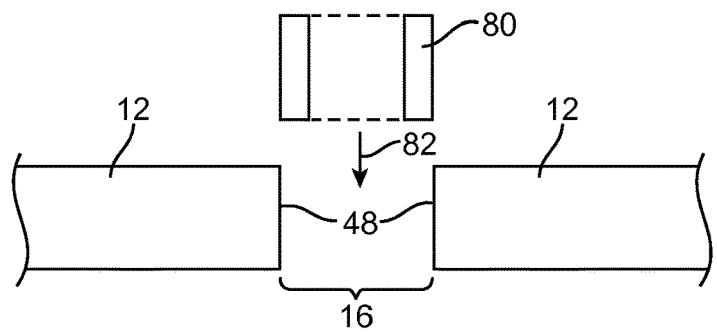
FIG. 23 is a cross-sectional side view of the plastic structures of FIG. 22 showing how a sleeve structure may be inserted into the opening in accordance with an embodiment of the present invention.
Figure 24:
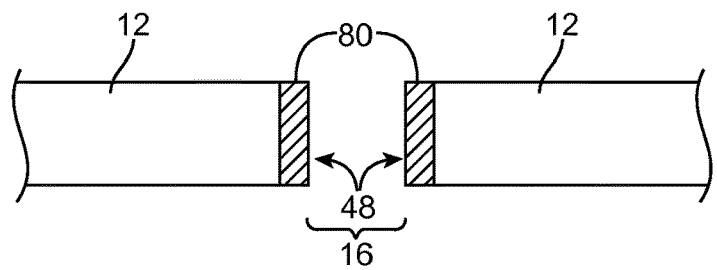
FIG. 24 is a cross-sectional side view of the plastic structures of FIG. 23 in which the sleeve structure of FIG. 23 has been mounted in the opening to serve as a liner structure that provides the inner surface of the opening with enhanced resistance to cracking in accordance with an embodiment of the present invention.

To enhance the ability of plastic structures 12 to withstand crack formation on walls 48, the surface of walls 48 may be lined with an insert structure such as sleeve 80 of FIG. 23. Sleeve 80 may have a shape that is configured to mate with opening 16 of FIG. 22. For example, if opening 16 of FIG. 22 has a circular shape, sleeve 80 may have the shape of a cylindrical hollow ring with an outer diameter that matches the diameter of hole 16 of FIG. 22. If opening 16 has another shape (e.g., a rectangular shape), sleeve 80 may have the shape of a hollow rectangular ring (as an example). FIG. 23 shows how sleeve 80 may be inserted into opening 16 in direction 82. As shown in FIG. 24, the center of sleeve 80 is hollow, so that sleeve 80 forms a lining to walls 48 without blocking opening 16.

Figure 6:
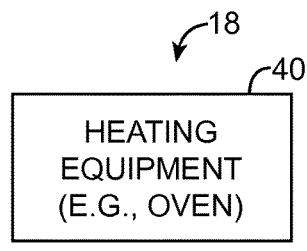
FIG. 6 is a diagram of illustrative heating equipment in accordance with an embodiment of the present invention.

Sleeve 80 may be attached within opening 16 by welding using equipment 18 of FIG. 3 (e.g., laser welding, ultrasonic welding, etc.), by applying a chemical such as a plastic solvent or adhesive between sleeve 80 and the surface of walls 48 of opening 16 of FIG. 22 using equipment 18 of FIG. 4, by heating sleeve 80 and/or structures 21 using heating equipment 18 of FIG. 6 or equipment 18 of FIG. 3, or by otherwise attaching the structures of sleeve 80 to plastic structures 12. Sleeve 80 may be formed from plastic, metal, carbon-fiber composites or other composite materials, glass, ceramic, other materials, or combinations of these materials. If desired, sleeve 80 may be formed in the position shown in FIG. 24 by injection molding (e.g., by forming sleeve 80 from a shot of plastic on top of existing plastic structures 12).

Figure 25:
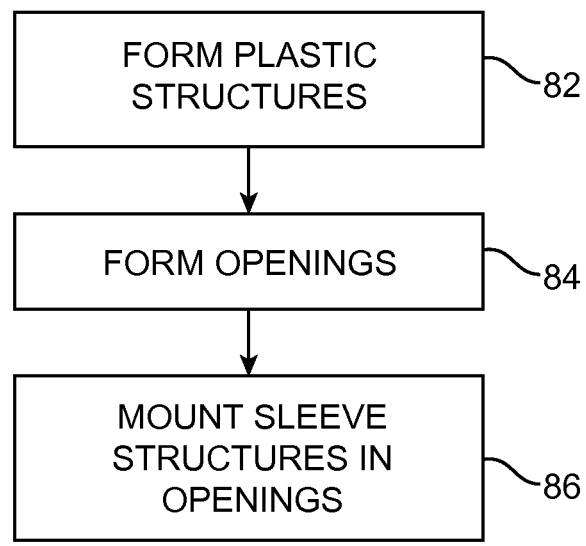
FIG. 25 is a flow chart of illustrative steps involved in forming plastic structures having an opening with walls that receive a sleeve that serves as liner structures in accordance with an embodiment of the present invention.

A flow chart of illustrative steps involved in lining the surfaces of opening 16 in plastic structures 12 with sleeve structures 80 to enhance the ability of plastic structures 12 to withstand stress-induced cracking is shown in FIG. 25.

At step 82, an injection molding operation or other operation may be used in forming plastic structures 12. For example, plastic such as polycarbonate, ABS, PC/ABS, or other thermoplastic materials may be injection molded into a metal mold having a shape of an electronic device housing structure for an electronic device such as electronic device 10 of FIG. 1. The plastic structures that are formed during the operations of step 82 may include electronic device housing walls having a thickness of less than 5 mm, less than 4 mm, less than 3 mm, less than 2 mm, less than 1 mm, or less than 0.5 mm (as examples).

At step 84, equipment such as machining tool 18 of FIG. 2, laser cutting equipment (see, e.g., equipment 18 of FIG. 3), water-jet cutting equipment such as equipment 18 of FIG. 7, or other equipment may be used to form opening 16 of FIG. 18. In forming opening 16, stress may be imparted to wall 48.

At step 86, equipment 18 (e.g., laser equipment 18 of FIG. 3, an ultrasonic welder, or other equipment that can deposit localized energy to walls 48, equipment for applying a solvent or other chemical to the surface of opening 16 of FIG. 18 such as equipment 18 of FIG. 4, or other suitable equipment) may be used in attaching sleeve 80 two the inner surface of opening 16, thereby forming lined opening 16 of FIG. 24. If desired, sleeve 80 may be formed by injection molding sleeve structures 80 directly on top of plastic structures 12 using plastic injection molding equipment (e.g., equipment 18 of FIG. 5).

The surfaces of opening 16 may, if desired, be provided with a coating that is treated to help enhance the ability of opening 16 to withstand stress-induced cracking. An illustrative lining scheme based on depositing coatings and treating the deposited coatings is illustrated in FIGS. 21, 22, 23, and 24.

Figure 26:
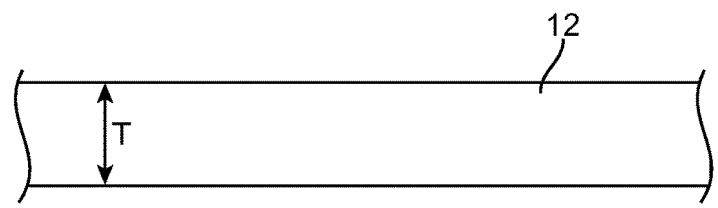
FIG. 26 is a cross-sectional side view of plastic structures such as plastic electronic device housing structures in which an opening may be formed in accordance with an embodiment of the present invention.

Initially, plastic structures 12 may appear as shown in FIG. 26. Plastic structures 12 of FIG. 26 may be planar injection molded housing structures characterized by a wall thickness T (e.g., a wall thickness of 0-5 mm or other suitable thickness), as described in connection with FIG. 12. Plastic structures 12 may be, for example, wall structures for a plastic housing for electronic device 10 of FIG. 1.

Figure 27:
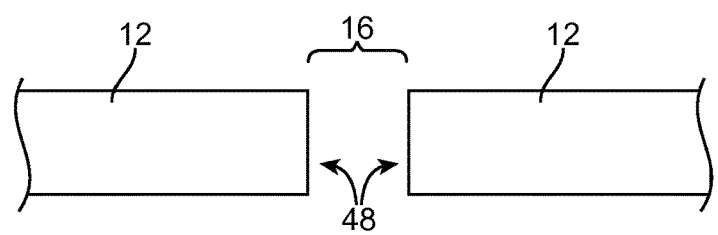
FIG. 27 is a cross-sectional side view of the plastic structures of FIG. 26 following formation of an opening in accordance with an embodiment of the present invention.

As shown in FIG. 27, one or more openings such as opening 16 may be formed in plastic structures 12 of FIG. 26. Openings such as opening 16 may be formed by using machining equipment such as machining equipment 18 of FIG. 2 or other cutting equipment 18. As described in connection with FIGS. 10 and 11, the machining process has the potential for introducing stresses into the surface of structures 12 along walls 48 of opening 16. These stresses have the potential to give rise to cracks. To enhance the ability of plastic structures 12 to withstand crack formation on walls 48, the surface of walls 48 may be coated with coating 88 of FIG. 28. Coating 88 may be solder paste or other precursor to forming a metal layer, may be a polymer precursor such as liquid (uncured) epoxy, or may be other coating materials.

Figure 29:
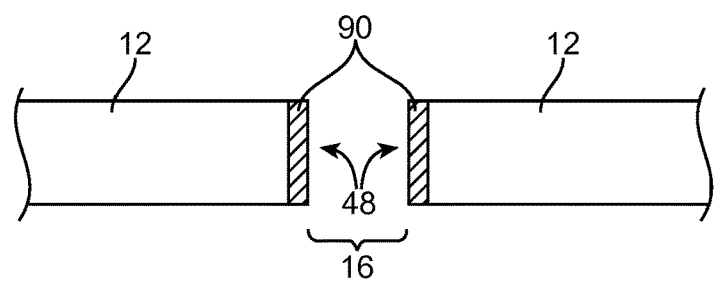
FIG. 29 is a cross-sectional side view of the plastic structures of FIG. 28 following treatment of the coating material on the inner surface of the opening to provide the inner surface of the opening with liner structures that enhance resistance to cracking in accordance with an embodiment of the present invention.

After applying a layer of material such as coating 88 to walls 48 of opening 16, coating 88 may be treated with light or heat to form liner layer 90 of FIG. 29. If, for example, layer 88 is a layer of thermally curable epoxy, heat may be applied to cure layer 88 (e.g., using heating equipment 40 of FIG. 6 or equipment 18 of FIG. 3) to form layer 90. If layer 88 is formed from ultraviolet-light-curable epoxy, layer 88 may be cured by application of ultraviolet light (e.g., using equipment 18 of FIG. 3). If layer 88 is formed from a solder paste or other metal paste or paint, layer 88 may be heated using heating equipment 18 of FIG. 18 (e.g., a reflow oven) or other heating equipment to form liner layer 90 of FIG. 29.

Figure 30:
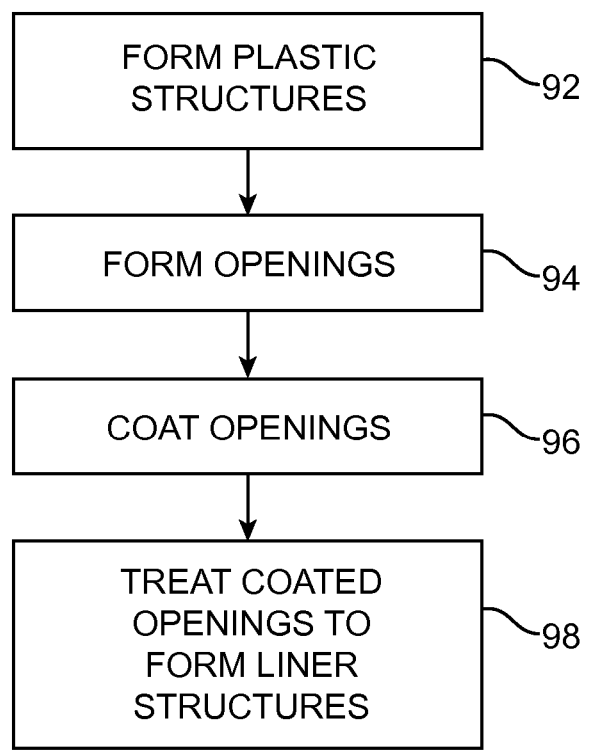
FIG. 30 is a flow chart of illustrative steps involved in forming plastic structures that are coated with a material and treated to provide an inner opening surface with enhanced resistance to cracking in accordance with an embodiment of the present invention.

A flow chart of illustrative steps involved in forming lining structures such as structures 90 on walls 48 of opening 16 in plastic structures 12 to enhance the ability of plastic structures 12 to withstand stress-induced cracking is shown in FIG. 30.

At step 92, an injection molding operation or other operation may be used in forming plastic structures 12. For example, plastic such as polycarbonate, ABS, PC/ABS, or other thermoplastic materials may be injection molded into a metal mold having a shape of an electronic device housing structure for an electronic device such as electronic device 10 of FIG. 1. The plastic structures that are formed during the operations of step 92 may include electronic device housing walls having a thickness of less than 5 mm, less than 4 mm, less than 3 mm, less than 2 mm, less than 1 mm, or less than 0.5 mm (as examples).

At step 94, equipment such as machining tool 18 of FIG. 2, laser cutting equipment (see, e.g., equipment 18 of FIG. 3), water-jet cutting equipment such as equipment 18 of FIG. 7, or other equipment may be used to form opening 16 of FIG. 18. In forming opening 16, stress may be imparted to wall 48.

Figure 28:
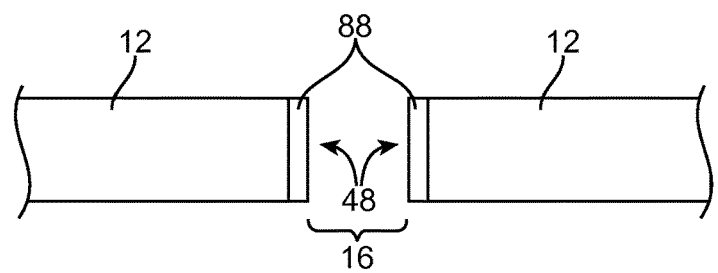
FIG. 28 is a cross-sectional side view of the plastic structures of FIG. 27 in which a material has been used to coat the inner surface of the opening in accordance with an embodiment of the present invention.

At step 96, equipment such as equipment 18 of FIG. 4 may be used to deposit coating layer 88 on walls 48 of opening 16, as shown in FIG. 28. Layer 88 may be formed from a polymeric material (e.g., a thermoset material such as epoxy), solder paste, or other material that may form a liner when treated.

At step 98, equipment 18 of FIG. 3 may apply light, heat, or other treatment to layer 88 or other heating equipment such as heating equipment 40 may be used to apply heat to layer 88. Following exposure to light, heat, or other treatment, the material of layer 88 may be converted into liner layer 90 of FIG. 29. For example, epoxy or other adhesives may cure to form liner structures 90, solder paste may reflow to form solder-based liner structures 90, or other changes may take place to convert coating layer 88 into a solid liner structure for opening 16 such as liner structure 90 of FIG. 29. Due to the presence of liner 90 on walls 48 of opening 16, plastic structures 12 in the vicinity of opening 16 may have a reduced tendency to form stress-induced cracks. Linger structure 90 of FIG. 29, liner structure 80 of FIG. 24, and liner structure 62 of FIG. 15 may, if desired, have a ductility that is greater than that of plastic structures 12 in walls 48.

The foregoing is merely illustrative of the principles of this invention and various modifications can be made by those skilled in the art without departing from the scope and spirit of the invention. Any of the foregoing embodiments may be used alone or in combination with one or more of any of the other foregoing embodiments.

What is claimed is:

1. A method comprising:
   molding a plastic housing structure for an electronic device that has an outer surface which defines an exterior surface of the electronic device and an opposing inner surface;
   machining an opening having a depth in the molded plastic housing structure using a cutting tool to define an outer opening edge at the outer surface, an inner opening at the opposing inner surface, and an opening sidewall extending substantially from the outer opening edge to the inner opening edge, the opening is configured to receive a component selected from the group consisting of: a button, a status indicator light, a sensor, and a plug;
   thermally activating the opening sidewall with a laser or with the cutting tool while machining the opening;
   forming a metal liner structure directly along the thermally activated opening sidewall by electrochemically depositing metal, the metal bonding to the plastic housing structure, such that the metal liner structure connects the outer surface and the opposing inner surface and is of a height substantially equal to the depth of the opening, and wherein a first end of the metal liner structure is positioned in line with the outer opening edge and a second end of the metal liner structure opposite the first end is positioned with the inner opening edge; and
   mounting a display in the plastic housing structure wherein the display has pixels.

2. The method defined in claim 1, wherein the display is a touch screen.

3. The method defined in claim 1, wherein the opening is configured to receive the button, and wherein the button is configured to receive user input.

4. The method defined in claim 1, wherein the opening is configured to receive the status indicator light.

5. The method defined in claim 1, wherein the opening is configured to receive the sensor.

6. The method defined in claim 1, wherein the opening is configured to receive the plug, and wherein the plug is a digital signal plug.

7. The method defined in claim 1, wherein:
   the opening is configured to receive the plug; and
   the plug is an audio plug.

8. The method defined in claim 1, wherein:
   the opening is exposed to the exterior of the electronic device.

9. The method defined in claim 1, wherein machining the opening using the cutting tool to thermally activate the opening sidewall further comprises applying the cutting tool on the opening side wall for a determined dwell time to apply heat to the opening sidewall.

10. The method defined in claim 1, wherein the cutting tool comprises a cutting tool selected from the group consisting of a drill bit, a saw blade, a milling machine cutter, and a grinder.

11. The method defined in claim 1, wherein molding the plastic housing structure comprises injection molding the plastic housing structure.

12. The method defined in claim 1, wherein the metal liner structure comprises a metal selected from the group consisting of copper and nickel.

13. The method defined in claim 1,
   wherein the opening sidewall is thermally activated with a laser after machining the opening using the cutting tool and before forming the metal liner structure.

14. A method for forming a plastic housing structure for an electronic device, comprising:
   molding the plastic housing structure including an exterior surface and an opposing interior surface, wherein the exterior surface defines an exterior surface of the electronic device;
   drilling an opening in the molded plastic housing structure, wherein:
   the opening in the molded plastic housing structure has a depth and is defined by a wall surface that extends substantially from an interior edge at the interior surface to an exterior edge at the exterior surface;
   the opening is configured to receive at least one of: a button, a status indicator, a sensor, or a plug; and
   a dwell time of a cutting tool on the wall surface is selected to apply sufficient heat to the wall surface to activate the wall surface for forming a metal liner structure;
   forming the metal liner structure on the wall surface from the exterior edge to the interior edge using electrochemical deposition directly on the plastic of the wall surface, the metal liner structure having a height substantially equal to the depth of the opening, and wherein a first end of the metal line structure is positioned in line with the exterior edge and a second end of the metal liner structure opposite the first end is positioned with the interior edge; and
   mounting a display with pixels in the plastic housing structure of the electronic device.

* * * * *